United States Patent [19]

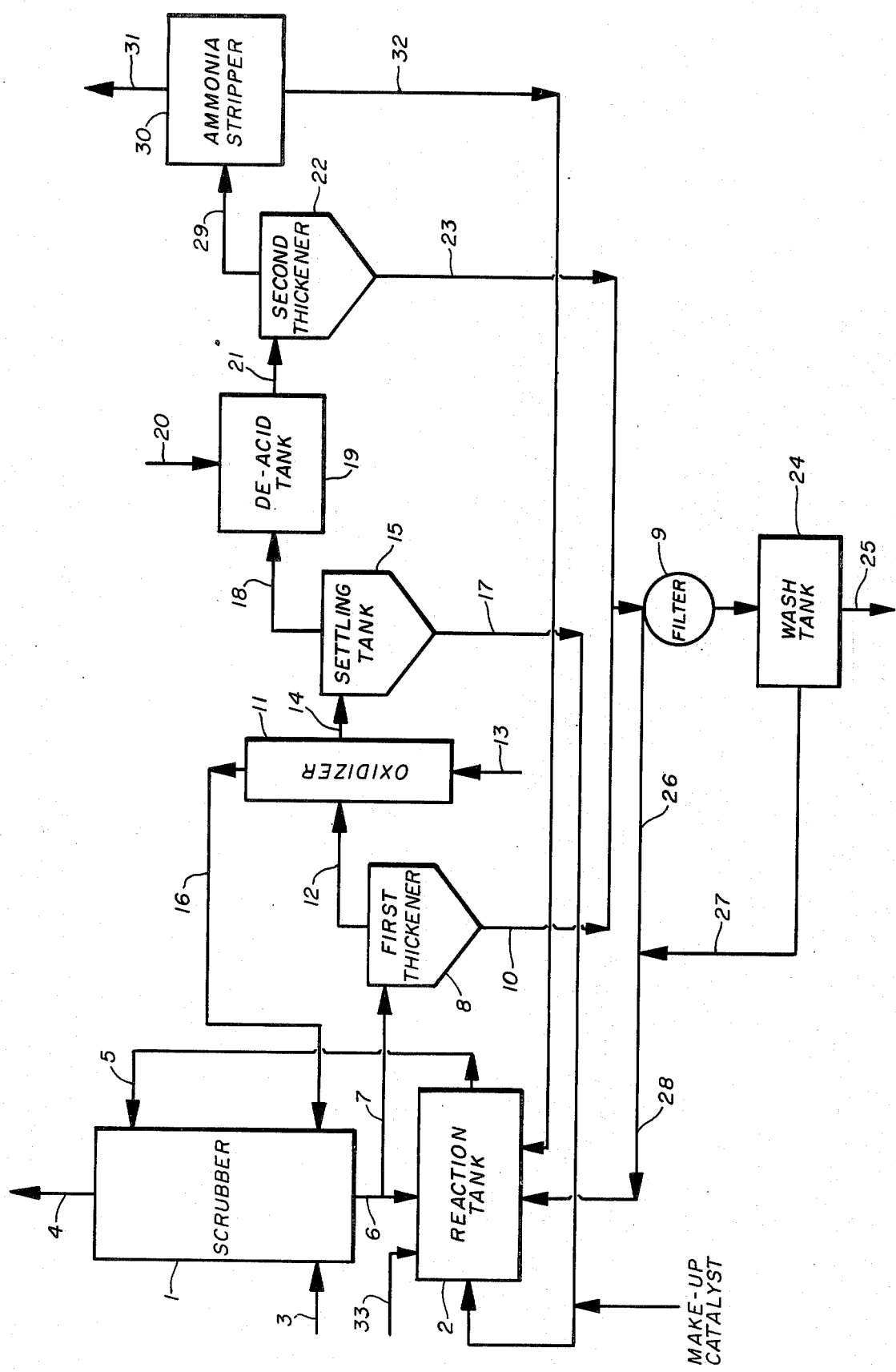

Mehta et al.

[11] 4,167,578

[45] Sep. 11, 1979

[54] METHOD FOR REMOVING SULFUR AND NITROGEN COMPOUNDS FROM A GAS MIXTURE

[75] Inventors: Arun K. Mehta, Windsor; Carl R. Bozzuto, Enfield; Prabhudas P. Kantesaria, Windsor, all of Conn.

[73] Assignee: Combustion Engineering, Inc., Windsor, Conn.

[21] Appl. No.: 835,546

[22] Filed: Sep. 22, 1977

[51] Int. Cl.$^2$ .............................................. C01B 21/00
[52] U.S. Cl. ................................... 423/235; 423/242
[58] Field of Search ................ 423/235, 239, 242, 244

[56] References Cited

U.S. PATENT DOCUMENTS

| | | | |
|---|---|---|---|
| 2,021,548 | 11/1935 | Goodeve | 423/242 |
| 2,781,245 | 2/1957 | Robertson et al. | 423/357 |
| 3,980,756 | 9/1976 | Dixson et al. | 423/242 |
| 3,985,860 | 10/1976 | Mandelik et al. | 423/242 |
| 3,991,161 | 11/1976 | Saitoh et al. | 423/235 |
| 3,992,508 | 11/1976 | Saitoh et al. | 423/235 |
| 3,995,006 | 11/1976 | Downs et al. | 423/242 |
| 4,013,430 | 3/1977 | Adachi et al. | 423/242 |
| 4,046,856 | 9/1977 | Itoo et al. | 423/242 |
| 4,047,891 | 9/1977 | Schuetz et al. | 423/242 |
| 4,055,623 | 10/1977 | Saitoh et al. | 423/235 |
| 4,061,743 | 12/1977 | Senjo et al. | 423/235 |
| 4,079,118 | 3/1978 | Gorai | 423/235 |

FOREIGN PATENT DOCUMENTS

| | | | |
|---|---|---|---|
| 5057992 | 5/1975 | Japan | 423/242 |
| 5154899 | 5/1976 | Japan | 423/235 |

Primary Examiner—G. O. Peters
Attorney, Agent, or Firm—Arthur L. Wade

[57] ABSTRACT

The Air Quality Control System utilizes the reaction between nitrogen oxides and the sulfites and bisulfites which are produced as a slurry of lime/limestone absorbs sulfur dioxide from a mixture of gases to produce ammonia from the absorption of nitrogen oxides.

1 Claim, 1 Drawing Figure

METHOD FOR REMOVING SULFUR AND NITROGEN COMPOUNDS FROM A GAS MIXTURE

BACKGROUND OF THE INVENTION

1. Field of the Invention

This invention relates to the method and apparatus for removing sulfur and nitrogen compounds from combustion gases before discharge to atmosphere. More particularly, the invention relates to absorbing sulfur dioxide and nitrogen oxides by a slurry of lime/limestone and catalyzing the reaction between the nitrogen oxides and sulfites and bisulfites with subsequent recovery of the catalyst and ammonia.

2. Description of the Prior Art

The Air Quality Control System (AQCS) has been primarily developed to remove $SO_2$ from combustion gases. A slurry of water and lime/limestone is brought into physical contact with combustion gases to be scrubbed. Many techniques have been developed to implement the absorption of $SO_2$ from flue gases with the lime/limestone slurry. Continual improvements are demanded in the art so as to overcome increasing costs.

A technical demand in the art is to remove oxides of nitrogen from combustion gases. There are limited means to control these compounds by temperature of the combustion process. There remain nitrogen oxides which could be removed at the same time the sulfur dioxide is scrubbed from the gases.

SUMMARY OF THE INVENTION

It is an object of the invention to utilize iron in solution to catalyze a reaction between nitrogen oxides and sulfites and bisulfites to remove the nitrogen compounds from a gas mixture.

Another object of the invention is to recover and recycle the catalyst.

Another object is to control the pH of the process of facilitate the recovery of ammonia.

The invention contemplates the process of contacting a mixture of gases with a slurry of lime/limestone and an iron compound. The iron compound will function as a catalyst in the reaction between the nitrogen oxides in the gas mixture and the sulfites and bisulfites formed when the sulfur dioxide in the mixture reacts with the lime/limestone.

The compounds are bled from the contact-mixing zone and thickened. The overflow from the thickening process is oxidized to lower the pH and precipitate the iron catalyst.

Settling again separates the solids from the clear solution. Lime is added to neutralize the acid and raise the pH for the recovery of ammonia.

Other objects, advantages and features of the invention will become apparent to those skilled in this art as they consider the description, appended claims and the drawings.

DESCRIPTION OF THE DRAWING

The drawing is a schematic of the portion of an AQCS in which the invention is embodied.

DESCRIPTION OF THE PREFERRED EMBODIMENT

The disclosure of an AQCS begins with the scrubber 1 and reaction tank 2. A gas mixture to be treated, or scrubbed, is directed in a path defined by conduit 3 which is connected to scrubber 1. The scrubbed gas is withdrawn from the scrubber 1 through conduit 4.

More specifically, the gas mixture is disclosed as flue gas containing sulfur dioxide and oxides of nitrogen which are to be removed from the flue gas. Scrubber 1 is a multiple stage absorber in which a slurry of lime/limestone is brought into intimate contact with the flue gases.

Both the $SO_2$ and $NO_x$ are absorbed from the gases. However, while the $SO_2$ absorption is readily accomplished in only a few equilibrium stages, as many as 15–30 theoretical absorption stages are required for $NO_x$ absorption. These stages may be banks of sprays, sieve plates, or any other suitable gas-liquid contacting device in either a counter current or crosscurrent mode. This specific structure, and its arrangement, is not a part of the present invention and will not be disclosed in detail. Scrubber 1 is, functionally, a "black-box" in which adequate contact between the flue gas and slurry is presumed.

Within scrubber 1, liquid-to gas ratios of 30–50 gal/1000 cfm of gas are established to achieve absorption. The scrubbing slurry contains $CaCO_3$ and $CaSO_3$ solids for the absorption of $SO_2$ and $NO_x$ and $CaSO_4$ solids to promote seed crystallization to avoid scaling. A range in the order of 10–15% solids slurry is commonly employed.

Various concentrations of ionic species are developed in the scrubbing solution by its contact with the $SO_2$ and $NO_x$. Also, an iron catalyst is in solution to catalyze the absorption of $NO_x$. A typical catalyst could be iron chelate such as iron EDTA.

The following reactions are expected in scrubber 1:

$$SO_2 + H_2O \rightarrow H_2SO_3$$

$$2H_2SO_3 + 2NO \rightarrow 2H_2SO_4 + N_2$$

$$CaCO_3 + 2SO_2 + H_2O \rightarrow Ca(HSO_3)_2 + CO_2$$

$$CaSO_3 + SO_2 + H_2O \rightarrow Ca(HSO_3)_2$$

$$2NO_2 + 4CaSO_3 + 8H_2O \rightarrow N_2 + 4CaSO_4 \cdot 2H_2O$$

$$2NO_2 + 5CaSO_3 + Ca(HSO_3)_2 + 11H_2O \rightarrow Ca(NH_2SO_3)_2 + 5CaSO_4 \cdot 2H_2O$$

$$4NO_2 + 4CaSO_3 + 2H_2O \rightarrow Ca(NO_2)_2 + Ca(NO_3)_2 + 2Ca(NH_2SO_3)_2$$

$$2NO + 3CaSO_3 + Ca(HSO_3)_2 + 7H_2O \rightarrow Ca(NH_2SO_3)_2 + 3CaSO_4 \cdot 2H_2O$$

$$2NO + CaSO_3 + 4H_2O \rightarrow N_2 + 2CaSO_4 \cdot 2H_2O$$

Some oxidation will occur, due to the excess oxygen present in flue gas:

$$Ca(HSO_3)_2 + \tfrac{1}{2}O_2 \rightarrow CaS_2O_6 + H_2O$$

$$Ca(HSO_3)_2 + O_2 + 2H_2O \rightarrow CaSO_4 \cdot 2H_2O + H_2SO_4$$

The scrubbing solution, or slurry, is flowed into scrubber 1 through conduit 5. As a point of reference, it is noted the pH of this solution is expected to fall in the range of 6.0–6.5. The solution leaving the scrubber 1, through conduit 6, is expected to have a somewhat lower pH in the range of 4.5–6.0.

The solution from scrubber 1 drops into reaction, or mix, tank 2. The various return streams from other steps of the process, along with fresh additive, are sent to tank 2 where they mix to form the scrubbing solution taken by conduit 5 to scrubber 1.

A bleed stream is established from conduit 6 through conduit 7 to a first thickener 8. The solids in this bleed are mostly $CaSO_4$ and $CaSO_3$. From the first thickener 8, they are discharged with a solid concentration in the order of 30% to a vacuum filter 9 through conduit 10. The waste products are thereby separated from the main stream.

The liquid overflow from the first thickener 8 is directed to oxidizer 11 through conduit 12. Air is introduced into the liquid through conduit 13. The air bubbles up through the overflow solution from conduit 12 to facilitate oxidation reactions. This process will lower the pH of the solution to within the range of 2.0-3.0. The expected reactions are:

$$Ca(HSO_3)_2 + \tfrac{1}{2}O_2 \rightarrow CaS_2O_6 + H_2O$$

$$Ca(HSO_3)_2 + 2H_2O + O_2 \rightarrow CaSO_4.2H_2O + H_2SO_4$$

$$CaS_2O_6 + 2H_2O \rightarrow CaSO_4.2H_2O + SO_2$$
$$Ca(NH_2SO_3)_2 + 4H_2O \rightarrow CaSO_4.2H_2O + (NH_4)_2SO_4$$

As the sulfuric acid forms, the pH is reduced and the iron catalyst precipitates. Hydrolysis of the $Ca(NH_2SO_3)_2$ occurs, this being only one form of the proposed calcium, nitrogen, sulfur complex.

The resulting slurry in oxidizer 11 is flowed through conduit 14 to settling tank 15 where the solids are again concentrated. The gas evolved in the oxidizer 11 is fed, by conduit 16, back to the scrubber 1 to prevent discharge of its traces of $SO_2$.

In settling tank 15, the solids of the slurry from oxidizer tank 11 are concentrated to the order of 15%. The concentrated solids are returned to the mixing, or reaction tank 2 through conduit 17. The catalyst is thereby recovered from the waste stream.

The clear solution from settling tank 15 is decanted into conduit 18 and flowed to mixing tank 19. Lime is added through conduit 20. This lime neutralizes the sulfuric acid. The elevated ph facilitates the recovery of ammonia. The expected reaction in tank 19 is:

$$(NH_4)_2SO_4 + CaO + H_2O \rightarrow CaSO_4.2H_2O + 2NH_3$$

This slurry in mixing tank 19 is passed through conduit 21 to second thickener 22 where the solids are separated from the solution. When the solids are concentrated to the order of 30% they are flowed down conduit 23 to join the solids of conduit 10 in feed of the vacuum filter 9.

The filter 9 concentrates the solids to the order of 50%. This mixture is then passed to washer 24 to recover both $NH_3$ and the iron catalyst. The final solids, mostly $CaSO_4$ and $CaSO_3$, are discharged from the process through conduit 25. The clear filtrate from the filter 9 is conducted by conduit 26 to mix with the wash water of conduit 27 and return to the reaction tank 2 through conduit 28.

The overflow liquid from second thickener 22 is decated to conduit 29. This overflow is conducted to stripper 30. Ammonia is recovered to conduit 31. Here again, the solution is flowed in conduit 32 to reaction tank 2. At tank 2, $CaCO_3$ is added through conduit 33 to adjust the pH to the order of 6.0-6.5 for the scrubbing in tower 1.

CONCLUSION

First among the advantages of the disclosed system in that both $SO_2$ and $NO_x$ are absorbed from the gas mixture. Thus, these major pollutants are both removed from industrial flue gases to protect the environment.

Second, ammonia is obtained as a by-product. This is a fundamental chemical with general usage.

Third, as added stages are required to remove $NO_x$, the efficiency of scrubbing and the utilization of limestone is improved.

Fourth, the system is simply an extension of the current lime/ limestone AQCS. Therefore, the $NO_x$ removal should be readily obtained as an additional feature of a system already well developed.

Fifth, the system is modular to the extent that the $NO_x$ removal portion can be isolated. The $SO_2$ removal portion of the system can then be operated separately.

In a broad sense, the invention is embodied in the process where gases to be treated by removal of their sulfur and nitrogen compounds are scrubbed by an aqueous slurry, the contact being carried out in a zone above a zone with the quantitative capacity which allows the chemical reactions to complete before recycling the slurry to continuously scrub the gases. This cycle is continuously bled at the point where the scrubbing slurry flows from the contact zone to the lower zone where the chemical reaction stabilizes before recycling begins.

A first thickening zone receives the bled slurry. The liquids decanted are then oxidized and settled to again concentrate the solids. The solution from the settling is then decanted to a mixing tank where lime is added to neutralize the acid. Ammonia is then stripped from the solution.

The solids of the settling stage are recycled to the reaction tank. $CaCO_3$ is added to the reaction tank and pH of the slurry thereby adjusted for the scrubbing.

The specific improvement is centered around the introduction and use of iron in solution to catalyze the reaction of nitrogen oxides with the sulfites and bisulfites of the lime/limestone in the form of an aqueous slurry with the attendant recovery of ammonia and the various separation stages required for catalyst recovery and waste elimination.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A process for the removal of sulfur dioxide and nitrogen oxides from gas mixtures including,
    (a) contacting a gas mixture containing sulfur dioxide and nitrogen oxides with an aqueous slurry at a pH of 6.0 to 6.5 containing lime/limestone and dissolved chelated iron and providing residence time for said slurry after its contact with said gas mixture to permit further reaction whereby said sulfur dioxide and nitrogen oxides are reacted with said slurry and whereby sulfur compounds are precipitated therefrom and dissolved nitrogen-containing compounds are formed, (b) continuously bleeding a portion of the reacted slurry at a pH of 4.5 to 6.0 into a first thickening zone, (c) separating said precipitated sulfur compounds from the slurry liquids in the first thickening zone and decanting the slurry liquids containing the dissolved chelated iron and dissolved nitrogen-containing compounds into an oxidizing zone, (d) passing air through the decanted liquids in the oxidizing zone until the pH has been lowered to 2.0 to 3.0 in the precipitation of the chelated iron, (e) separating said precipitated chelated iron from the liquid containing the nitrogen-containing compounds and recycling the chelated iron to the aqueous slurry for contacting the gas mixture, (f) adding lime to the separated liquids containing the nitrogen-containing compounds to raise the pH and to form ammonia and precipitated sulfur compounds, (g) separating the precipitated sulfur compounds from the liquid and stripping ammmonia from the liquid.

* * * * *